United States Patent Office 3,251,700
Patented May 17, 1966

1

3,251,700
REFRACTORY COMPOSITIONS

Victor Mandorf, Jr., Fostoria, Ohio, assignor to Union Carbide Corporation, a corporation of New York
No Drawing. Filed June 24, 1963, Ser. No. 290,236
5 Claims. (Cl. 106—65)

This invention is directed to novel refractory compositions which are chemically and thermally stable and more particularly to compositions comprising aluminum nitride as an essential constituent.

The compositions of the present invention are chemically and thermally stable and have certain outstanding properties which make them extremely desirable for use in many fields. As used herein, chemically and thermally stable means that the compositions are more resistant, in general, to chemical change and physical deterioration induced by heat than ordinary materials.

To be useful as refractory materials a composition must be able to withstand exposure to high temperature for extended periods of time without serious chemical and physical change. Such materials should be able to resist cracking or deterioration due to sudden changes in temperature. Relatively high mechanical strength and resistance to corrosion and oxidation over a wide range of temperatures are other properties which are desirable in refractory materials.

It is an object of this invention to provide refractory compositions which exhibit a high degree of resistance to oxidation at elevated temperatures.

It is another object to provide refractory compositions having a thermal shock resistance greater than that of pure titanium diboride.

The present invention contemplates a composition comprising aluminum nitride in combination with titanium diboride.

Such compositions are found to exhibit superior resistance to thermal deterioration induced by sudden and substantial changes in temperature and further, to be extremely resistant to corrosion and oxidation. Moreover, articles fabricated from such compositions are found to have other outstanding properties such as high strength and controlled electrical resistivity. The electrical resistivity of the compositions can be varied over a wide range by varying the relative amounts of aluminum nitride and $TiB_2$.

In general the present invention contemplates a composition comprising from 1 to 99 weight percent aluminum nitride, the remainder being $TiB_2$.

A preferred composition comprises from about 25 to about 85 weight percent aluminum nitride, inclusive, and from 15 to 75 weight percent titanium diboride.

The presence in the compositions of the invention of up to 40 weight percent aluminum nitride increases the thermal shock resistance of articles formed from the compositions, without causing changes in electrical conductivity. The presence of aluminum nitride in amounts in excess of 75 weight percent in the compositions of the invention results in substantial changes in electrical resistivity of the formed article. By controlling the aluminum nitride content from about 75 to about 85 weight percent, the electrical resistivity can be varied from about $10^3$ to about $10^{11}$ micro-ohms-centimeters. Such articles are useful as high temperature resistors since they exihibit outstanding resistance to both chemical change and physical deterioration at temperatures above 1000° C.

2

Table I illustrates the variation in electral resistivity of titanium diboride-aluminum nitride compositions with increasing concentration of aluminum nitride.

TABLE I

| Weight percent aluminum nitride: | Micro-ohm-centimeters |
|---|---|
| 60 | $4\times10^2$ |
| 75 | $1\times10^3$ |
| 80 | $5\times10^3$ |
| 82 | $2.3\times10^4$ |
| 84 | $7.9\times10^5$ |
| 85 | $5.0\times10^{10}$ |

The aluminum nitride-titanium diboride compositions described herein have been found to exhibit a resistance to thermal shock which is superior to that of pure titanium diboride. Many ceramic and refractory materials exhibits a substantial amount of high temperature strength. Unfortunately however, many such materials do not provide an adequate degree of resistance to thermal shock and are therefore unsatisfactory for certain high temperature applications. The requirements of thermal shock resistance are particularly important when the refractory material is required to provide service over a long period of time while being cycled from hot to cold, as for example, in the case of electrical ignitors.

The properties of refractories which in varying degrees influence the resistance to thermal shock are thermal expansion, elastic modulus, and strength, and thermal conductivity. Generally, high values of flexural strength and thermal conductivity combined with low values of elastic modulus and coefficient of thermal expansion can be expected to indicate an excellent resistance to fracture caused by thermal shock. The addition of aluminum nitride has been found to substantially increase the thermal shock resistance of a refractory material, i.e., titanium biboride.

Table II shows the advantages achieved through the addition of 10 weight percent of aluminum nitride to titanium diboride with respect to improving the thermal shock resistance. For these tests a series of samples were hot pressed in the form of rods having a diameter of 3½ inches and a length of 10 inches. The rods were heated inductively at a rate of 500° C. per hour to the temperatures indicated in column 2. The rods were then removed from the furnace and allowed to air cool. In each case, the rods containing aluminum nitride and those containing no aluminum nitride were allowed to cool under the same conditions. The rods containing 10 weight percent aluminum nitride remained unaffected until they were cooled from temperatures of 1000° C. When cracking did occur in these samples it was not as severe as that encountered in the pure titanium diboride samples. These results indicate a considerable improvement in thermal shock resistance for the small amounts of aluminum nitride involved.

TABLE II

| Composition | Temperature, ° C. | Results |
|---|---|---|
| $TiB_2$ | 500 | Some slight cracking. |
| $TiB_2$+10AlN | 500 | No cracking. |
| $TiB_2$ | 750 | Severe cracking. |
| $TiB_2$+10AlN | 750 | No cracking. |
| $TiB_2$ | 1,000 | Very severe cracking. |
| $TiB_2$+10AlN | 1,000 | Some cracking. |

The refractory compositions described herein are prepared by mixing the constituents, e.g., powdered aluminum nitride and titanium diboride, to form a homogeneous blend. These materials may be reduced to the form of a powder by any convenient technique such as ball milling and the like. In general, the particle size is not narrowly critical and may range from about 1 micron to about 5 microns in diameter. The homogeneous admixture of particles can then be placed in a mold and hot pressed in an inert atmosphere to form the desired shape.

The hot pressing operation is carried out under standard conditions well known in the art, e.g., 1800° C. and 2000 pounds per square inch.

The hot pressed compositions thus produced are found to have a relatively high percent of theoretical density. Densities to 96 percent of theoretical have been obtained for aluminum nitride-titanium diboride compositions.

Alternatively, the homogeneous mixtures have been sintered to densities of from 70 to 95 percent of theoretical maximum density. The admixture is milled to a suitable particle size, mixed with a fugitive binder and cold pressed into the desired shape. These molded articles are then sintered in an inert atmosphere at a temperature between about 1800° C. and 2100° C.

The term theoretical density as used herein, including the appended claim represents a density calculated from the density of each component and the relative proportions involved.

*Example 1*

Approximately 680 grams aluminum nitride and 5120 grams of titanium diboride were blended in a ball mill for a period of 24 hours. The particles of titanium diboride had been previously ball milled to reduce the average particle size to from 2 to 2.5 microns. The homogeneous blend was then screened through a 35 mesh screen to break up any agglomerates, and loaded by vibratory packing into graphite mold having an inside diameter of 3½ inches. The blend was then hot pressed in an argon atmosphere at 1800° C. and 2000 pounds per square inch pressure, in a resistance heated tube furnace. The furnace was allowed to cool at its natural rate while the mold was maintained under pressure.

Several compositions containing varying amounts of aluminum nitride and titanium diboride were prepared as above and some of their physical properties measured. The results of the measurements are tabulated in Table III.

TABLE III

| AlN [1] | Temp., ° C. | Pressure, p.s.i. | Density [2] | Percent of Theor. Density | Resistivity [3] at 25° C. | Flexural Strength, p.s.i. | |
|---|---|---|---|---|---|---|---|
| | | | | | | 25° C. | 1,000° C. |
| 10 | 1,800 | 2,000 | 3.67 | 86.3 | 22.5 | | |
| 60 | 1,800 | 2,000 | 3.49 | 95.0 | 400 | 30,000 | |
| 75 | 1,800 | 2,000 | 3.35 | 95.5 | 1000 | 38,400 | 33,000 |
| 80 | 1,800 | 2,000 | 3.28 | 95.0 | 5000 | 35,040 | 31,000 |
| 82 | 1,800 | 2,000 | 3.27 | 95.5 | $2.3\times10^4$ | | |
| 85 | 1,800 | 2,000 | 3.14 | 92.5 | $5.0\times10^{10}$ | 29,500 | 16,500 |

[1] Weight percent of AlN.
[2] Grams per cubic centimeter.
[3] Micro-ohm-centimeters.

*Example 2*

A blend of 750 grams of titanium diboride and 250 grams of aluminum nitride were ball milled to a homogeneous admixture as described in Example 1. The admixture was then mixed with a polyethylene oxide fugitive binder and cold pressed at 20,000 pounds per square inch into rectangular bars ½" x ⅝" x 6". These bars were then sintered in an argon atmosphere at 2050° C.

Several additional compositions containing varying amounts of aluminum nitride in admixture with titanium diboride were prepared and sintered as described above.

Table IV is a tabulation of some physical properties of the sintered bars.

TABLE IV

| AlN [1] | Density [2] | Percent of Theoretical Density | Resistivity [3] | Flexural Strength [4] |
|---|---|---|---|---|
| 50.0 | 2.94 | 77.4 | 355 | 13,800 |
| 41.7 | 3.35 | 86.0 | 127 | 27,000 |
| 33.3 | 3.58 | 89.1 | 89 | 27,800 |
| 25.0 | 3.88 | 94.0 | 52 | 29,600 |

[1] Weight percent AlN.
[2] Grams per cubic centimeter.
[3] Micro ohm-centimeters.
[4] Pounds per square inch at 25° C.

Resistance to oxidation of aluminum nitride-titanium diboride compositions were determined by measuring the gain in weight of one quarter inch diameter by two inch long samples upon exposure to air at 1000° C. flowing through an oxidation furnace at a rate of about 3 cubic feet per hour. The weight changes were continuously measured by an automatic gravimetric balance. A sample of 100 percent titanium diboride gained 0.0035 gram per square centimeter after 7.5 hours, whereas a composition containing 75 weight percent aluminum nitride gained only 0.00134 gram per square centimeter after 44 hours of exposure. Another sample containing 80 weight percent aluminum nitride was found to have gained 0.00106 gram per square centimeter after a period of 60 hours. Further investigation has indicated that the presence of aluminum nitride substantially reduces the rate of oxidation of titanium diboride compositions at elevated temperatures.

In view of the above described properties the compositions of invention may be advantageously employed as materials of construction for high temperature resistors, glow ignitors, ceramic tools and the like.

For example, a composition comprising 82 weight percent aluminum nitride and 18 weight percent titanium diboride was hot pressed into a rod having a diameter of one quarter inch. A two inch piece of this rod was used as an ignitor element for igniting a gas flame. One such ignitor element operated successfully for 4,764 ignition cycles. During these tests the ignitor attained a temperature of about 1200° C. almost instantly. The element continued to ignite the gas throughout the test and exhibit outstanding flexural strength both before and after the test was completed. An examination of the element at the end of 4,764 cycles disclosed no sign of cracking or deterioration due to thermal shock, thus evidencing the superiority of titanium diboride-aluminum nitride compositions over tungsten and silicon carbide neither of which materials would withstand such treatment.

What is claimed is:

1. A refractory composition consisting essentially of titanium diboride and from 1 to 99 weight percent aluminum nitride.

2. A refractory composition consisting essentially of titanium diboride and from 25 to 85 weight percent of aluminum nitride.

3. A refractory composition comprising from 75 to 85 weight percent aluminum nitride and the balance titanium diboride.

4. A refractory composition comprising from 10 to 40 weight percent aluminum nitride and the balance titanium diboride.

5. A refractory composition consisting essentially of titanium diboride and from 25 to 85 weight percent aluminum nitride said composition having a density of between 70 and 96 percent of the theoretical density.

References Cited by the Examiner

UNITED STATES PATENTS

| | | | |
|---|---|---|---|
| 2,929,126 | 3/1960 | Bollack et al. | 106—65 |
| 3,108,887 | 10/1963 | Lenie et al. | 106—65 |

TOBIAS E. LEVOW, *Primary Examiner.*